Oct. 15, 1963  C. R. BROWNOLD  3,107,191
METHOD AND APPARATUS FOR EXTRUDING PLASTIC FILM
Filed Aug. 3, 1960  2 Sheets-Sheet 1
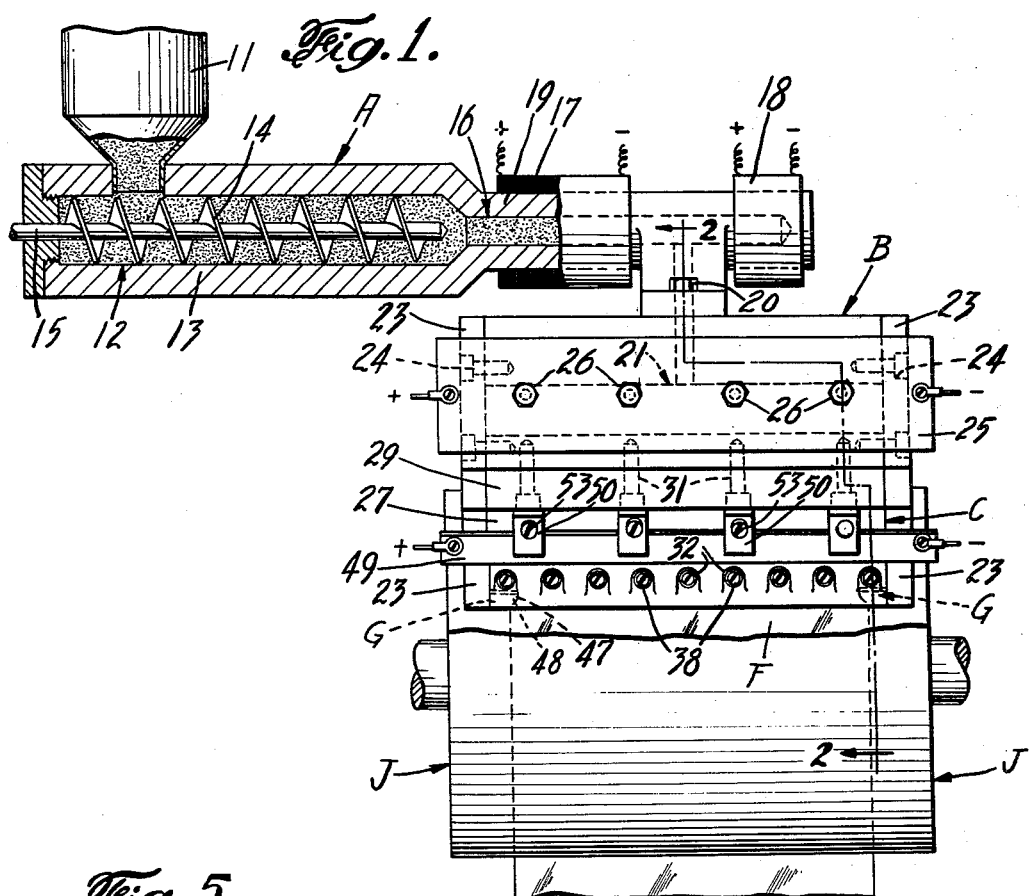
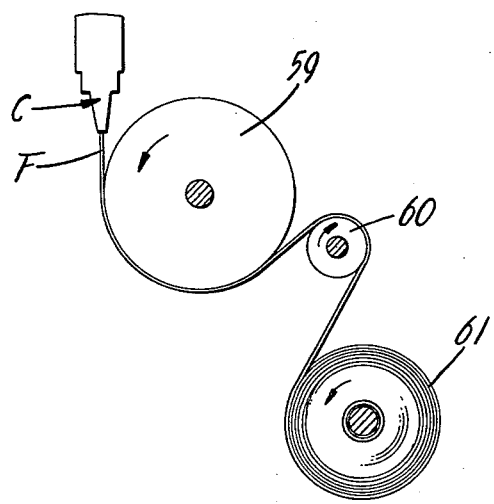
INVENTOR.
CHARLES ROBERT BROWNOLD
BY Robert P Auber
George W. Reiler
ATTORNEYS

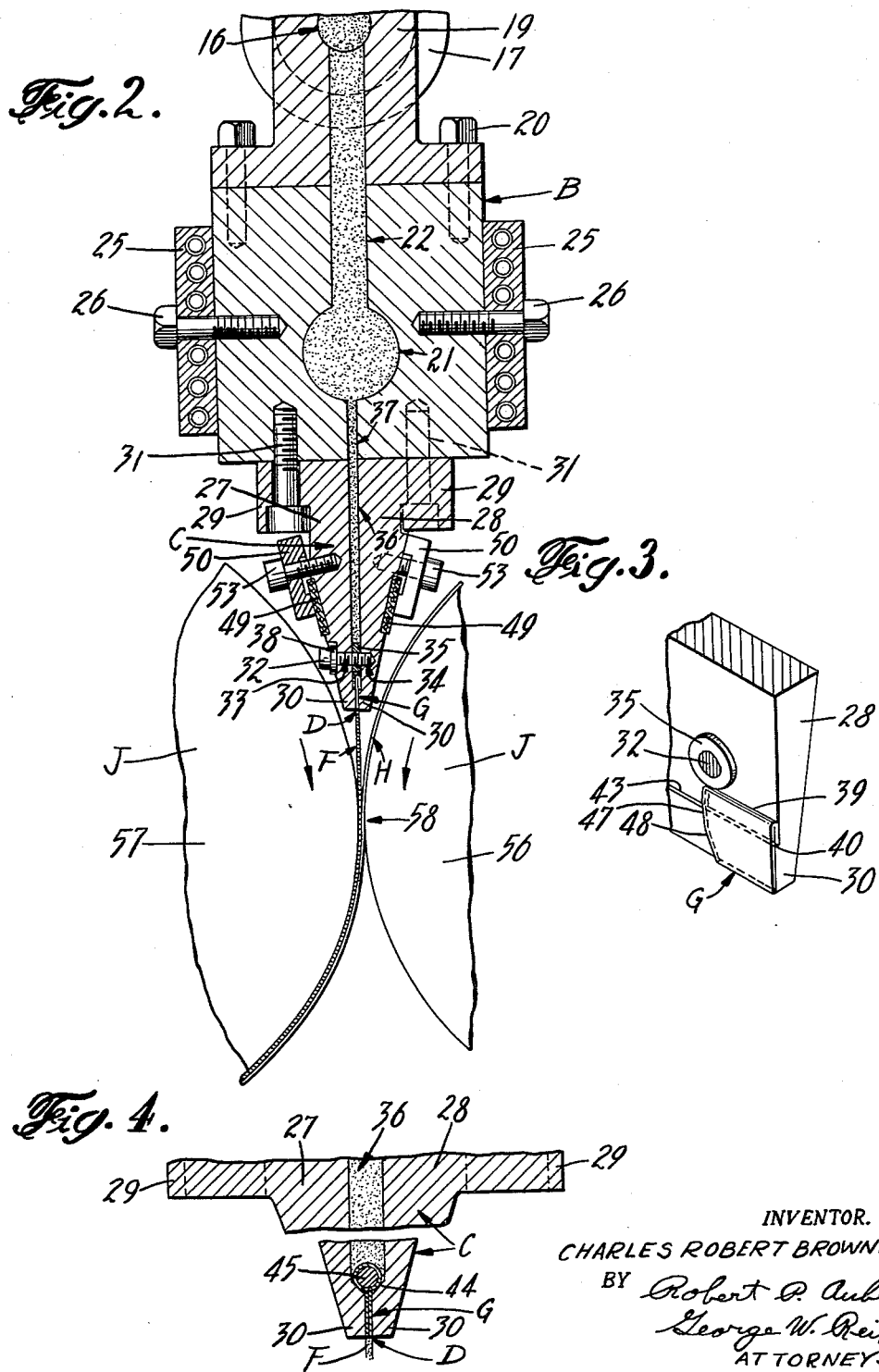

3,107,191
METHOD AND APPARATUS FOR EXTRUDING
PLASTIC FILM
Charles Robert Brownold, Easton, Pa., assignor to American Can Company, New York, N.Y., a corporation of New Jersey
Filed Aug. 3, 1960, Ser. No. 47,193
11 Claims. (Cl. 156—244)

The present invention relates to the extrusion of thin plastic films such as are used for coating web materials, and more particularly to a method of and apparatus for extruding a film of a thermoplastic material to be applied to a carrier web without the formation of edge beads of thickened section in the extruded film.

In applying a film of a thermoplastic resin to a carrier web of paper, cloth, metal foil or the like, the normally solid thermoplastic material is extruded through a die while in the molten state directly into contact with the web to be coated. The molten film is then pressed into bonding engagement with the web and simultaneously chilled to a temperature below its solidification point by passing the coated web between two parallel rolls. The cooling roll which contacts the plastic film is generally provided with a smooth hard surface and is maintained at a temperature below the solidification temperature of the plastic by the passage of a coolant through the roll. The pressure roll which contacts the carrier web is generally provided with a resilient surface, e.g., rubber, to insure the uniform application of bonding pressure across the width of the coated web as it passes through the rolls.

Heretofore, it has been generally considered difficult or even impossible to extrude a thermoplastic film of uniform thickness. This is due to surface tension phenomena whereby the longitudinal edges of the extruded film tend to draw in and become thicker than the adjacent portions of the film, forming continuous edge beads having a somewhat rounded cross-section. As a result, in applying the full width of a thin extruded plastic film to a uniformly thick carrier web of at least the same width, the edge beads of the extruded film form ridges of thickened section. With such ridges present, it becomes practically impossible to wind up the coated web into a smooth roll. Consequently, handling and processing of the unevenly wound rolls requires special equipment to minimize the damage to the unevenly wound edges of the rolled material and the waste resulting therefrom.

The ridges formed by the edge beads also result in considerable waste where the coated web forms the starting material for further operations requiring a coated web material of substantially uniform thickness. In the past, it has been necessary to trim away the edges of the coated web corresponding to the thickened ridges produced by the edge beads of the extruded plastic. Consequently, both the carrier web and the extruded plastic film were required to have a width greater than that required for the subsequent procession operations in order to provide for the excess width necessary for the removal of the thickened edge portions in the trimming operation. Obviously, the portions of the web and plastic film which are trimmed off and wasted appreciably increase the cost of producing the coated web material.

As a rule, it is necessary to maintain the extruded film in tension between the point where it leaves the extrusion die and the point where it comes into contact with the carrier web. This tends to stretch the film and decrease its thickness somewhat. Furthermore, in many cases the extruded film is deliberately stretched a considerable amount to greatly decrease its thickness prior to being brought into contact with the carrier web and pressure roll bonded thereto. A method used to achieve this involves running the carrier web through the pressure rolls at a higher linear speed than the speed of extrusion of the plastic film. Consequently, the carrier web exerts a stretching action on the portion of the film between the extrusion die and the line of contact with the web. Unfortunately, the stretching of the extruded film does not eliminate the thickened edge beads formed during extrusion but they generally remain in the stretched film in approximately the same proportion relative to the nominal film thickness as before. Therefore, the problems created by the uneven thickness of the coated web are still present.

One method of overcoming the above problem is disclosed in the N. Anderson U.S. Patent No. 2,894,853 issued July 14, 1959. This method involves thinning the carrier web before the coating operation along two longitudinal strips on the side to be coated, the thinned strips corresponding to the edge beads of the extruded film, so that the thickness of the coated web corresponding to the edge beads is substantially the same as the other portions of the web. However, this method requires additional equipment to effect the thinning operation on the carrier web and also precise control. It also may excessively weaken the coated web along the thinned portions of the carrier web. Furthermore, it is not well adapted for part web coating in which case the thinned strips are intermediate the edges of the web which is a more difficult operation to accomplish than when the thinning is done at the marginal edges.

An object of the present invention is to provide a method for extruding a thin film of thermoplastic material to be applied to a carrier web which will overcome the problems hereinbefore pointed out.

Another object is to provide such a method wherein the formation of edge beads of thickened section is substantially eliminated.

Another object is to provide an apparatus for extruding a thin thermoplastic film wherein the thickness of the longitudinal edges of the extruded film is substantially the same as the thickness of adjacent portions of the film.

A further object is to provide such an apparatus wherein the extruded film may be applied to a uniformly thick carrier web having a greater width than the film to produce a partially coated web having a substantially uniform thickness over the coated portion.

Still a further object is to provide such an apparatus wherein the necessity for trimming and discarding portions of the coated web having an excessive thickness attributable to the formation of thickened edge beads in the extruded film is eliminated, thereby reducing waste.

Yet a further object is to provide such an apparatus which is simply constructed and requires a minimum of operating control.

Numerous other objects and advantages of the invention will be apparent as it is better understood from the following description, which, taken in connection with the accompanying drawings, discloses a preferred embodiment thereof.

The apparatus utilized in the present invention includes a conventional plastic extruder element A having an extrusion head B. Attached to the extrusion head B is an extrusion die C having a thin die opening D out of which pressurized molten thermoplastic material is extruded in the form of a wide thin film F. A pair of inserts G are secured within the die opening D so as to provide a diverging configuration along the width dimension thereof, i.e. the width of the die opening is greater at the point where the plastic leaves the die opening than it is at the point where the plastic enters same.

When the extruded film F is to be applied directly to a running carrier web H, the extrusion die C is positioned adjacent to the nip of a pair of rolls J. The extruded plastic film F contacts the carrier web H just prior to the entry of the web into the roll nip, after which the web and film pass together into and through the roll nip, and are pressure bonded by the rolls J. While passing between the rolls J, the plastic film F is simultaneously cooled to a temperature which is below the solidification point.

Referring to the drawings:

FIGURE 1 is a plan view of an extrusion apparatus embodying features of the present invention;

FIG. 2 is an enlarged sectional view taken substantially along line 2—2 of FIG. 1;

FIG. 3 is a fragmentary view showing the method of retaining the die inserts within the extrusion die opening;

FIG. 4 is an enlarged partial sectional view of the extrusion die showing a modified form of die insert and method of retention; and FIG. 5 is a schematic side elevation of a modified form of the invention.

As a preferred or exemplary embodiment of the present invention, FIG. 1 shows an extruder element A having a hopper 11 communicating with a bore 12 centrally located in a barrel 13. Rotatably mounted within the bore 12 is a screw 14 having a drive shaft 15 connected to a suitable power source such as an electric motor (not shown). A thermoplastic synthetic resin, e.g., polyethylene is placed within the hopper 11 in a suitably divided condition and flows by gravity into the bore 12 from whence it is urged by the powered screw 14 towards a delivery chamber 16. Simultaneously, the thermoplastic material is heated to the molten state by the passage of electric current through electric resistance heating elements 17 and 18 disposed about the delivery chamber housing 19.

An extrusion head B secured to the housing 19 by screws 20 has a long cylindrically shaped distribution chamber 21 (FIG. 2). A passage 22 connects the distribution chamber 21 to the delivery chamber 16 whereby the molten plastic under the pressure created by the action of the screw 14 rotating in the bore 12 flows into the distribution chamber. The ends of the distribution chamber 21 are closed by side plates 23 which cover the ends of the extrusion head B and are secured thereto by screws 24. Electrical resistance heating elements 25 secured to the outer surfaces of the extrusion head B by screws 26 maintain the plastic in the molten state as it flows through the extrusion head.

The extrusion die C is formed by an upper die member 27 and a lower die member 28 each having a flange portion 29 and an extrusion lip portion 30. The flange portions 29 are secured to the extrusion head B by screws 31. The die members 27 and 28 are also secured to each other in a fixed spaced relationship by screws 32 which extend through a series of holes 33 in the upper die member 27 adjacent the extrusion lip 30 to engage an aligned series of threaded holes 34 in the lower die member. The fixed spaced relationship is effected by spacer washers 35 located on each screw 32 between the die members 27 and 28 thereby forming a passage 36 therebetween. The screws 32 and spacers 35 insure that the extrusion die opening D formed between the die lips 30 is fixed at a predetermined dimension corresponding to the desired thickness of the extruded film F.

The passage 36 communicates with the distribution chamber 21 in the extrusion head B by means of an aligned passage 37 in the extrusion head. The side plates 23 which seal the ends of the extrusion head B also extend over and close the ends of the passage 36 and extrusion opening D thereby preventing the escape of the pressurized molten plastic through the ends of the extrusion die C. A gasket 38 made of soft copper or other suitable material is employed beneath the head of each screw 32 to prevent leakage of the molten plastic at these points.

The width of the extruded film F is controlled by positioning a pair of inserts G within the extrusion opening D at each end thereof so that they abut the side plates 23. The portion of the insert G which is within the extrusion opening D has a thickness equal to the thickness of the extrusion opening fitting tightly therein. As shown in FIG. 3, the inserts G are retained within the extrusion opening D by folding one edge of the insert back upon itself to form a strip 39 of double thickness. The strip 39 is positioned within the passage 36 with the folded edge 40 contiguous a step 43 formed at the juncture of the passage 36 and the extrusion opening D.

In the modified form of the invention shown in FIG. 4, the inserts G are made of material having a thickness equal to one-half the thickness of the extrusion opening D. The material is folded back upon itself with a loop 44 being formed at the bend so that the portion of the insert G within the extrusion opening D has a double thickness. The inserts G are held in place by deckle rods 45 which are secured to the side plates 23 and which extend into the loops 44.

It is understood that means other than those described may be used to retain the inserts G within the extrusion opening D and achieve the desired result. It should also be understood that the extrusion die C may be machined so as to have the desired marginal edge configuration of the extrusion opening D integral the extrusion die C thereby eliminating the need for separate inserts G. However, such an extrusion die would be less versatile since it would not be adaptable for extruding films of various widths. It would also be much more costly to fabricate so that the embodiment having inserts as described is preferred.

The inwardly facing edge of each insert G consists of an initial portion 47 which is parallel to the direction of flow of the extruded film F followed by a portion 48 which angles outwardly. Consequently, the latter portion of the extrusion opening D is divergent along the width dimension. For reasons not wholly understood, this divergence results in an extruded film F having marginal edges of substantially the same thickness as the adjacent central portion of the film. While not wishing to be bound by any particular theory, it is thought that the divergence along the width dimension of the extrusion opening D allows a limited side flow to occur as the molten plastic is extruded through the extrusion opening resulting, in effect, in a controlled starved feed at the marginal edge portions as the film F is being extruded. Consequently, the thickness of the marginal edge portions of the film F leaving the extrusion opening D tend to be feathered somewhat having a thickness at the marginal edges which is slightly less than the thickness of the central portion of the film. Immediately thereafter, surface tension phenomena come into play tending to draw in the edges of the still molten film. However, by cooling the extruded film F quickly, the edge thinning action of the extrusion die C and the edge thickening action attributable to surface tension phenomena are balanced resulting in an extruded film of substantially uniform thickness.

The extrusion die C is provided with electrical resistance heating elements 49 secured to the outer surfaces of the die members 27 and 28 by means of clamps 50 and screws 53. The heating elements 49 maintain the extrusion die C at a uniform elevated temperature thereby insuring that the temperature, and therefore the viscosity, of the plastic is uniform across the width of the die opening D. The uniformity of viscosity of the plastic is necessary to prevent variations in film thickness across the width of the extruded film F. This is especially so where the plastic film subsequent to being extruded and while still in the semi-molten state is stretched to decrease its thickness since variations in viscosity across the width of the extruded film causes the film to stretch unevenly resulting in variations in the final film thickness across its width.

The instant invention is uniquely adapted for producing coated web materials in which the extruded plastic film F is applied to a carrier web having the same or a greater width than the extruded film to produce a partially coated web having a substantially uniform thickness over the coated portion. In the preferred embodiment shown in FIGURES 1 and 2, the extrusion head B is positioned adjacent to a roll stand having a pair of opposed rolls J in rolling contact. The rolls J consist of a pressure roll 56, preferably, though not necessarily, having a resilient outer surface, and a smooth surfaced metal cooling roll 57 which is internally cooled with water by suitable means (not shown). The extrusion die C is preferably positioned as close as possible to the roll nip 58 of the rolls J since the extruded film has a tendency to neck in and it is desirable to minimize the time in which this can occur.

A carrier web H is continuously fed from a supply roll (not shown) into the nip 58 of the rolls J. The extruded film F is applied to the web H directly after leaving the extrusion opening D and while the film has a temperature which will insure adequate adhesion between the film and the web. The film F and web H pass together through the rolls J with the film F being in contact with the cooling roll 57, where the film and web are pressed together into bonding engagement and simultaneously the plastic is chilled by the cooling roll 57 to a temperature which is below the solidification temperature. The coated web may then be wound into a roll for further processing or storage by suitable means (not shown).

Usually, the thickness of the extruded film F is decreased prior to being laminated to the carrier web H. The means of accomplishing this is to operate the rolls J at a higher peripheral speed than the speed at which the film F is being extruded. Consequently, the carrier web traveling at a higher speed through the roll nip 58 than the speed of extrusion of the film F exerts a stretching force on the free portion of the extruded film between the extrusion opening D and the position at which the film comes into contact with the web. The film F is thereby continuously and substantially uniformly decreased in thickness.

The modified form of the invention shown schematically in FIG. 5 is for producing free film for use as such. In this form, a conventional cooling roll 59 which is internally cooled with water by suitable means (not shown) is positioned adjacent the extrusion die C. The extruded film F leaving the extrusion die C contacts the surface of the cooling roll 59 and is cooled to a temperature below the solidification temperature. The solidified film F is continuously carried by the cooling roll 59 rotating in the direction indicated by the arrow to a take-off roll 60 where the film is stripped from the cooling roll 59 and travels to a conventional winding reel 61. It is to be understood that the method heretofore described for decreasing the thickness of the extruded film is applicable to the production of free plastic film, and is accomplished by operating the cooling roll 59 at a higher linear speed than the speed at which the film F is being extruded.

By the novel improvements disclosed in the subject invention, it is possible to extrude a wide thin plastic film without the formation of rounded edge beads having a thickness greater than the thickness of the central portions of the film. It can be readily seen that such a method of extruding plastic films is extremely useful especially where the film is to be applied directly to a carrier web having the same or a greater width than the film. In addition to eliminating the handling and winding problems caused by the thickened sections of the coated web, the subject invention eliminates the trimming waste necessarily resulting when the coated web forms the starting material for further operations requiring coated web material of substantially uniform thickness.

Furthermore, the subject apparatus is simply constructed and can thus be easily fabricated, assembled, operated and cleaned. Compared to plastic film extrusion apparatus heretofore disclosed, it has greater versatility as regards film widths since merely by replacing the die inserts the width of the extruded film can be changed.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. An apparatus for extruding a thin plastic film comprising, means for heating a thermoplastic resin to the molten state and applying pressure thereto, a die secured to and having a die passage communicating with said plastic heating and pressurizing means, said die having die lips forming an extrusion opening communicating with said die passage and terminating in an orifice through which said heated plastic is extruded in the form of a thin film, and means adjacent said orifice for cooling said extruded film, said extrusion opening having a finite length in the direction of flow of the extruded film and bounded by two parallel surfaces having a spacing regulating the thickness of the extruded film and two side surfaces having a spacing approximately equal to the width of the extruded film, said side surfaces comprising a parallel portion adjacent said die passage and a laterally divergent portion angled outwardly from said parallel portion and terminating at said orifice, said divergency causing the marginal edge portions of said film to have a lateral outward side flow during said extrusion so as to thin the marginal edge portions of said extruded film, whereby the formation of thickened beads on the marginal edges of said extruded film is substantially eliminated.

2. The apparatus set forth in claim 1 wherein said cooling means comprises a smooth surfaced rotating drum, said drum being internally cooled by the passage of a coolant therethrough.

3. The apparatus set forth in claim 1 wherein said cooling means comprises a pair of opposed rolls at least one of which is cooled by the passage of a coolant therethrough, said rolls being in rolling contact with each other to form a roll nip, said extruded film passing through said roll nip and being cooled thereby.

4. The apparatus set forth in claim 3 wherein a supply of a carrier web material is provided adjacent said extrusion orifice, said web passing continuously through said roll nip together with said extruded film, said rolls being adapted to press said web and film into bonding engagement while cooling said film thereby forming a coated web having a coating of substantially uniform thickness.

5. The apparatus set forth in claim 1 wherein said die lips comprise a top member and a bottom member forming said parallel surfaces and two inserts forming said side surfaces, said inserts having a thickness substantially equal to the spacing between said parallel surfaces and being retained between said parallel surfaces at the outer ends thereof.

6. The apparatus set forth in claim 5 wherein said extrusion die has means for controlling the spacing between said parallel surfaces of said die lips whereby outward deflection of said parallel surfaces due to the pressure of the molten plastic flowing therebetween is substantially eliminated.

7. The apparatus set forth in claim 6 wherein said means comprises a plurality of screws connecting said top member and said bottom member adjacent said die lips and a plurality of spacer washers disposed on said screws between said top and bottom members.

8. The apparatus set forth in claim 1 wherein said extrusion die is provided with external heating means to maintain said plastic being extruded at a substantially uniform temperature.

9. The apparatus set forth in claim 8 wherein said heating means comprises electrical resistance heating elements secured to the outer surfaces of said extrusion die.

10. A method of extruding thin plastic films comprising the steps of heating a thermoplastic resin to the molten state and applying pressure thereto, conducting said pressurized molten plastic to a thin die opening comprising an initial portion having substantially parallel opposed side and end surfaces and a final portion having laterally divergent end surfaces extending to the outer end of said opening, extruding said plastic through said initial portion in the form of a thin plastic film having a predetermined thickness and width defined by the spacing between said parallel opposed side and end surfaces respectively, directing the marginal edge portions of said film laterally outwardly as it passes through said laterally divergent final portion thereby thinning said marginal edge portions and increasing the width of said film from said predetermined width, and cooling said film after it has emerged from said opening whereby the formation of thickened edge beads on said extruded film is substantially eliminated.

11. A method for producing sheet material comprising the steps of heating a thermoplastic resin to the molten state and applying pressure thereto, conducting said pressurized molten plastic to a thin die opening comprising an initial portion having substantially parallel opposed side and end surfaces and a final portion having laterally divergent end surfaces extending to the outer end of said opening, extruding said plastic through said initial portion in the form of a thin plastic film having a predetermined thickness and width defined by the spacing between said parallel opposed side and end surfaces respectively, directing the marginal edge portions of said film laterally outwardly as it passes through said laterally divergent final portion thereby thinning said marginal edge portions and increasing the width of said film from said predetermined width, conveying said film on to one surface of a carrier web, pressing said film and web into bonding engagement, and cooling said plastic film to a temperature which is lower than its solidification temperature thereby forming a coated sheet material having a coating of substantially uniform thickness.

References Cited in the file of this patent

UNITED STATES PATENTS

| | | |
|---|---|---|
| 1,717,620 | Page | June 18, 1929 |
| 2,329,421 | Shields | Sept. 14, 1943 |
| 2,607,712 | Sturken | Aug. 19, 1952 |
| 2,659,103 | Merritt | Nov. 17, 1953 |
| 2,668,988 | Bailey et al. | Feb. 16, 1954 |
| 2,712,155 | Nelson | July 5, 1955 |
| 2,727,275 | Nelson | Dec. 20, 1955 |
| 2,774,106 | Bethe | Dec. 18, 1956 |
| 2,865,048 | Hudson | Dec. 23, 1958 |
| 2,871,884 | Nelson | Feb. 3, 1959 |
| 2,923,971 | Nelson | Feb. 9, 1960 |
| 2,971,222 | Weissman | Feb. 14, 1961 |
| 2,982,995 | Groleau | May 9, 1961 |
| 3,018,515 | Sneddon | Jan. 30, 1962 |